Aug. 19, 1969 P. G. BARTLETT 3,462,746

CERAMIC FERROELECTRIC MEMORY DEVICE

Filed Feb. 14, 1966 4 Sheets-Sheet 1

INVENTOR.
PETER G. BARTLETT

BY
Meyer, Tilberry & Body
ATTORNEYS

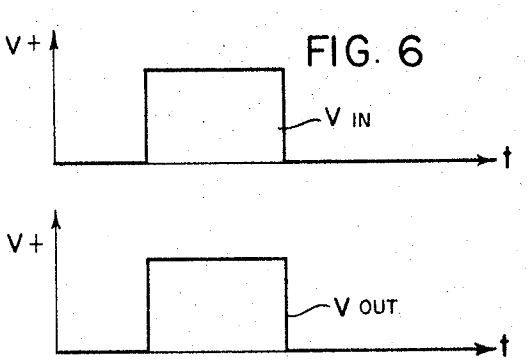
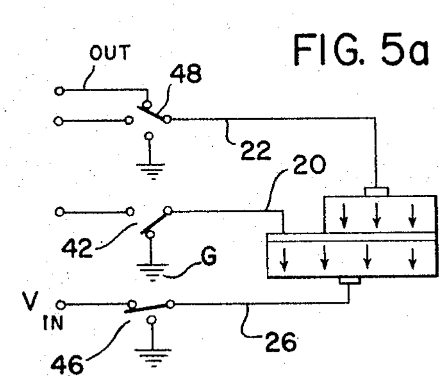
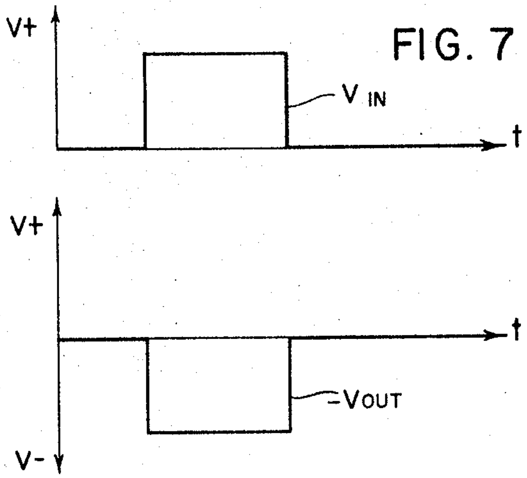
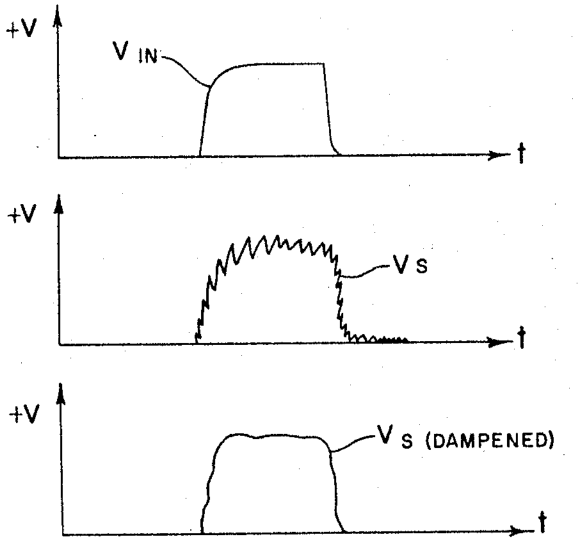
FIG. 8
INVENTOR.
PETER G. BARTLETT
BY
*Meyer, Tilberry & Body*
ATTORNEYS

CERAMIC FERROELECTRIC MEMORY DEVICE

INVENTOR.
PETER G. BARTLETT

BY *Meyer, Tilberry & Body*

ATTORNEYS

CERAMIC FERROELECTRIC MEMORY DEVICE

Filed Feb. 14, 1966 4 Sheets-Sheet 4

INVENTOR
PETER G. BARTLETT

BY
*Meyer, Tilberry & Body*
ATTORNEYS

United States Patent Office 3,462,746
Patented Aug. 19, 1969

3,462,746

CERAMIC FERROELECTRIC MEMORY DEVICE

Peter G. Bartlett, Bettendorf, Iowa, assignor to E. W. Bliss Company, Canton, Ohio, a corporation of Delaware Filed Feb. 14, 1966, Ser. No. 527,223
Int. Cl. G11b 9/02
U.S. Cl. 340—173.2 19 Claims

ABSTRACT OF THE DISCLOSURE

A ceramic memory device is disclosed herein and which includes a ferroelectric storage capacitor memory plate having a surface and adapted to be polarized in one of two stable states. A driver means is adhesively secured to the memory plate to prevent relative lateral movement therebetween so that the driving means may transmit lateral and perpendicular mechanical forces to the memory plate. Means are also provided for obtaining output signals from the memory plate in response to forces imparted thereto by the driving means.

This invention relates to the art of ceramic memory devices and, more particularly, to an improved nondestructive ferroelectric memory device.

The invention is particularly applicable as a bistable memory device wherein the readout process of stored binary information is nondestructive and will be described with particular reference thereto; although it will be appreciated that the invention has broader applications and may, for example, be used in binary and ring counter circuits, shift registers, et cetera.

There is considerable demand in the computer field, as well as in other related fields, for a relatively inexpensive, nondestructive, random access memory element. The most commonly used random access memory element is the conventional ferromagnetic core. Production techniques of ferromagnetic cores generally require that a number of fine wire windings be wound and threaded around the cores. Hence, such cores are not subject to mass production techniques and, accordingly, they are expensive to produce.

One of the most significant disadvantages of a computer device utilizing ferromagnetic cores is that the readout process of stored information is destructive; that is, during the readout process the stored binary information is erased. Generally, however, so that the stored information may be repeatedly readout, additional circuitry is utilized for automatically rewriting the information. This, of course, limits the minimum time necessary to readout stored information during repeated readout-rewrite cycles. Also, ferromagnetic cores generate relatively low voltage outputs, i.e., in the millivolt range. This requires amplifier circuitry so that the output signal from the core may be used to drive suitable computer gating circuitry. Ferromagnetic cores are also sensitive to stray magnetic flux fields, as well as to nuclear radiation. Therefore, ferromagnetic core memory circuits are limited to applications where the core is not exposed to stray magnetic fields, or to any type of nuclear radiation. A still further limitation on the application of ferromagnetic cores is that they are sensitive to temperature variations. Memory circuits utilizing such cores are normally operated in air conditioned rooms at stabilized room temperatures, with the deviation therefrom not exceeding ±20° centigrade.

In order to overcome the above noted limitations inherent in the use of ferromagnetic cores, considerable attention has been directed in recent years to the application of ceramic materials to the computer field. In particular, attention has been directed to utilizing the electrostrictive, piezoelectric and ferroelectric characteristics found in many of these materials. Ferroelectric storage devices, or capacitors, comprise dielectric materials which depend upon internal polarization rather than upon surface charge for storage of information. A number of such materials are known, such as barium titanate, Rochelle salt, potassium niobate and lead zirconium titanium oxide. These materials may be prepared in the form of single crystals or ceramics upon which conductive coatings may be applied to provide terminals. Ferroelectric capacitors exhibit two stable states of polarization somewhat similar to the stable remanence states of magnetic materials when subjected to electric fields of opposite polarities and, as a consequence, are readily adapted for use as binary storage elements. As storage elements these materials exhibit characteristics that render them usable over a greater temperature range than that of ferromagnetic cores and, for example, have been found to be usable over a range of −55° centigrade to 100° centigrade. A further characteristic of ferroelectric capacitors is the piezoelectric property, or characteristic, of changing dimensions in response to potentials applied across the terminals of the capacitor, and, conversely, of producing a voltage differential between the terminals in response to mechanical pressures exerted between the opposing faces of the capacitor.

A memory device incorporating ferroelectric capacitors known heretofore takes the form of that disclosed in the United States patent to D. R. Young 2,782,397. That device includes a pair of substantially flat, ferroelectric capacitor plates; one serving as a drive plate and the other as a memory plate. The two plates are mechanically clamped together in superimposed parallel relationship by a holder which exerts resilient force on the plates in such a manner that stress forces acting in a direction vertically of the planes defined by the two plates, but not laterally thereof, may be transferred from the drive plate to the memory plate. The drive plate is permanently prepolarized and the memory plate is polarized either negatively or positively by application of an electric potential between its opposing flat surfaces so that it stores binary information, i.e., polarized negatively or positively. When a readout signal is applied to the drive plate its dimensions change, stressing the memory plate in directions vertically of its plane so that the memory plate develops an output signal dependent on its state of polarization. The memory plate, however, does not respond to changes in lateral dimensions of the drive plate since the two plates are not restrained in the lateral directions, but are merely resiliently clamped together with forces acting in directions vertically of the planes defined by the two planes. The output signal obtained from the memory plate, due to the vertical stress, takes the form of a transient alternating current voltage signal which commences with a sharp impulse which oscillates somewhat and then quickly decays. It is difficult to detect from such a signal whether it is indicative of a positively or negatively polarized memory plate. Further, the usable portion, i.e., the sharp impulse portion, of the output signal is quite short in time duration and does not correspond with the duration of the readout signal voltage applied to the drive plate. Also, the output voltage has been found to be in the millivolt range, requiring amplifying circuitry so that the signal can be used to drive computer gating circuitry.

The present invention is directed toward an improved ceramic memory device utilizing ferroelectric capacitors, wherein the output signal voltage obtained is sufficiently large that amplifying circuitry is not required for driving computer gating circuitry, and wherein the output voltage is of a distinctive nature, i.e., either positive or negative direct current voltage, so that it may be easily detected.

In accordance with the present invention, the improved ceramic memory device includes a ferroelectric memory plate having a surface; driving means, such as a piezoelectric plate, secured to the surface of the memory plate by adhesion, as by epoxy or heat fusing, to prevent at least relative lateral movement therebetween so that the driving means mechanically stress the memory plate in directions both laterally and perpendicularly of its surface; and, means for obtaining output signals from the memory plate generated as a result of such stresses.

In accordance with another aspect of the present invention, a ferroelectric memory plate is secured to a drive plate having piezoelectric characteristics, with the composite structure being coated with a dampening medium, such as epoxy, for purposes of dampening the tendency of the structure to vibrate in response to readout voltage applied to the drive plate, whereby the output voltage obtained from the memory plate is a dampened direct current voltage signal of a distinctive character representative of the state of polarization of the memory plate.

In accordance with a still further aspect of the present invention, the memory plate and drive plate are bonded to each other, as by epoxy or heat fusing, so that the memory plate will be mechanically stressed both laterally and perpendicularly of its plane when a readout voltage is applied to the drive plate, whereby the output voltage obtained from the memory plate will be a distinctive direct current voltage having a polarity representative of the polarity of the polarized memory plate, and having a duration substantially that of the duration of the applied readout voltage.

In accordance with a still further aspect of the present invention, the memory plate-drive plate composite structure is mounted, as by an epoxy bond or heat fusing, on an acoustic dispersive medium for purposes of absorbing acoustic energy and thereby minimizing the tendency of the output signal voltage obtained from the memory plate to be oscillatory in character.

In accordance with a still further aspect of the present invention, a plurality of memory plates are bonded, as by epoxy or heat fusing, to a common drive plate so that an interrogating readout voltage pulse applied to the drive plate will result in a distinctive output voltage being developed by each of the memory plates indicative of the state of polarization of the memory plate.

A primary object of the present invention is to provide a nondestructive, ceramic memory device which is capable of providing output voltages which are of magnitudes sufficient to gate associated circuitry without requiring signal amplification means.

Another object of the present invention is to provide a ceramic memory device capable of developing output voltages which are substantially nonoscillatory in character and, hence, easily detectable.

It is still a further object of the present invention to provide a ceramic memory device which is not substantially affected by application thereto of stray magnetic fields or nuclear radiation fields.

It is still a further object of the present invention to provide a ceramic memory device which is capable of providing useful output voltages in an operating temperature range from approximately −55° centigrade to 100° centigrade.

These and other objects and advantages of the invention will become apparent from the following description of the preferred embodiments of the invention as read in connection with the accompanying drawings, in which:

FIGURES 5A and 5B are schematic illustrations, similar to that of FIGURE 3, together with associated circuitry for applying readout voltages to the drive plate and obtaining output voltages from the memory plate;

FIGURE 6 illustrates wave forms of voltage versus time of applied readout and developed output voltages for the schematic illustration in FIGURE 5A;

FIGURE 7 illustrates wave forms of voltage versus time of applied readout and developed output voltages for the schematic illustration shown in FIGURE 5B;

FIGURE 8 illustrates wave forms of voltage versus time of applied readout voltage and undampened and dampened steady state output voltages;

Figure 1:
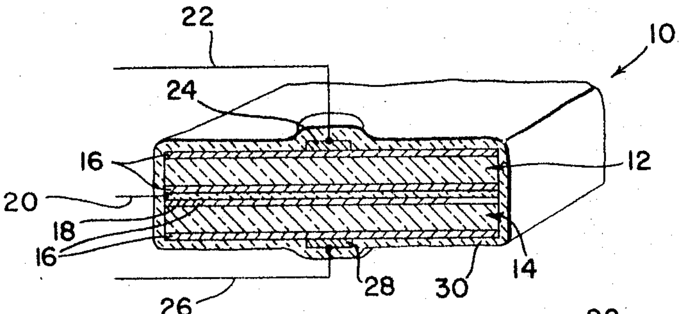
FIGURE 1 is a perspective view, partly in section, illustrating the construction of one embodiment of the invention.

Referring now to the drawings wherein the showings are for the purpose of illustrating preferred embodiments of the invention only, and not for purposes of limiting same, FIGURE 1 illustrates a ceramic memory device 10, which generally comprises a memory plate 12 and a drive plate 14. The memory plate 12 is constructed of ferroelectric material, such as barium titanate, Rochelle salt, potassium niobate or lead zirconium titanium oxide, for example. Preferably, however, memory plate 12 is constructed of lead zirconium titanium oxide since it is easy to polarize. Drive plate 14 may be constructed of any material that will change its dimensions upon the application of an electrical signal such as, for example, magnetostrictive material which upon application of current thereto will undergo physical dimension changes. Preferably, however, drive plate 14 is of ferroelectric material having piezoelectric characteristics, such as lead zirconium titanium oxide. As will be discussed hereinafter, drive plate 14 is permanently polarized and, hence, need not be constructed of easily polarizable materials, such as lead zirconium titanium oxide. Ceramic memory devices constructed in accordance with the invention have operated satisfactorily wherein the drive plate and memory plate were made of the same material, or of different materials.

As shown in FIGURE 1, plates 12 and 14 are, in their unstressed condition, approximately flat. The upper and lower surfaces of each plate are coated with conductive material 16, such as silver. In accordance with the invention, the facing surfaces of plates 12 and 14 are adhesively secured to each other, as by bonding with epoxy 18, so that the planes defined by the two plates are in superimposed parallel relationship. Epoxy 18, in accordance with the embodiment of the invention shown in FIGURE 1, is preferably a conductive epoxy, such as an epoxy silver solder, so that the lower surface of plate 12 and the upper surface of plate 14 are in conductive relationship. A conductive lead 20 has one end embedded in the conductive epoxy 18. A conductive lead 22 is electrically secured to the upper surface of plate 12 by means of epoxy silver solder 24. Similarly, a conductive lead 26 is electrically secured to the lower surface of plate 14 by means of epoxy silver solder 28. Further, in accordance with the present invention, the composite structure is coated with an acoustic dispersive material 30, such as epoxy.

Figure 2:
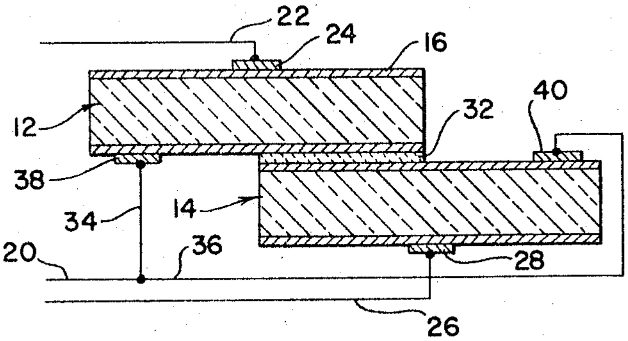
FIGURE 2 is a sectional view illustrating a second embodiment of the invention.

Referring now to FIGURE 2, there is shown another embodiment of the invention which is similar to that as illustrated in FIGURE 1 and, accordingly, like character references are used to identify like components. In this embodiment, plate 12 overlaps plate 14 and the two plates are secured together by a nonconductive epoxy 32, as opposed to the conductive epoxy 18 in the embodiment of FIGURE 1. To provide electrical terminals, lead 20 is provided with two branches 34 and 36 which are respectively electrically connected to plates 12 and 14 by means of epoxy silver solder connections 38 and 40.

Figure 3:
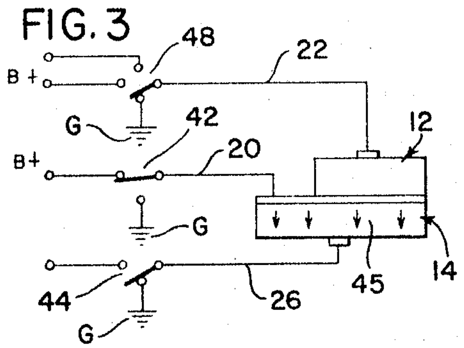
FIGURE 3 is a schematic illustration of the embodiment of the invention illustrated in FIGURE 1, together with associated circuitry for polarizing the drive plate.

Referring now to FIGURES 3 through 5, the embodiment of the invention, as illustrated in FIGURE 1, is illustrated schematically, together with associated circuitry for polarizing the drive plate, applying binary information to be stored to the memory plate, and for interrogating the memory device. Like character references are used to identify like components.

POLARIZING DRIVE PLATE

The first step preparatory to operation of the memory device 10 is to permanently polarize the drive plate 14. This is done by impressing an electric field through the ceramic material by applying direct current voltage across conductive leads 20 and 26. The voltage required for polarization is a function of the ceramic material used, the thickness of the drive plate, and the ambient temperature. The ferroelectric material used in the construction of one embodiment of the invention required approximately 25 volts direct current per millimeter thickness at room temperature for polarization. The polarity of the drive plate polarization is arbitrary, but should be consistent for a given system. Accordingly, with reference to FIGURE 3, drive plate 14 is permanently polarized by connecting lead 20 to a B+ voltage source, such as 200 volts positive direct current, through a suitable switch 42 and connecting lead 26 to ground G through a suitable switch 44. In this manner, drive plate 14 will be polarized in accordance with the direction of arrows 45 shown in FIGURE 3.

APPLYING BINARY INFORMATION

Figure 4A:
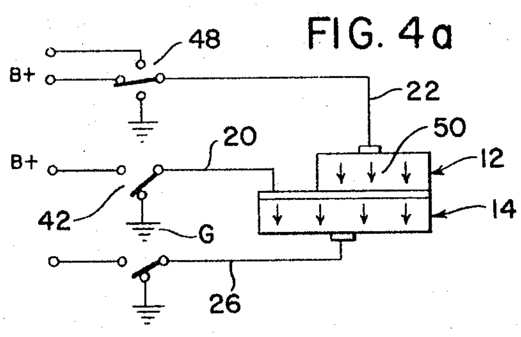
FIGURES 4A and 4B are schematic illustrations, similar to that of FIGURE 3, together with associated circuitry for polarizing the memory plate.
Figure 4B:
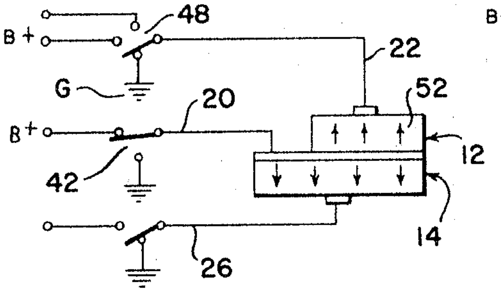

The next step preparatory to the operation of the ceramic memory device 10 is to apply the binary information that is to be stored to the memory plate 12. The binary information takes the form of either a positive direct current voltage ("1" signal), or a negative direct current voltage ("0" signal). Application of binary information to the memory plate 12 is accomplished by polarizing the memory plate by applying direct current voltage between conductive leads 20 and 22. In FIGURE 4A, a "1" signal is applied to memory plate 12 by connecting conductive lead 22 to a B+ voltage supply source through a suitable switch 48, and by connecting conductive lead 20 to ground G through switch 42. The state of polarization of memory plate 12 is indicated in FIGURE 4A by the direction of arrows 50. Similarly, the memory plate 12 may store a binary "0" signal, as is shown in FIGURE 4B, wherein lead 22 is connected to ground G through switch 48, and lead 20 is connected to the B+ voltage supply source through switch 42. This state of polarization of memory plate 12 is indicated by the direction of arrows 52 in FIGURE 4B. Having now permanently polarized the drive plate 14, and having applied binary information to memory plate 12, the memory device 10 is in condition for interrogation.

INTERROGATING MEMORY DEVICE

Interrogation of the memory device 10 to determine the polarity of the stored binary information in the memory plate 12 is accomplished by applying a direct current readout voltage pulse across conductive leads 20 and 26. The magnitude of the readout voltage is kept well below the polarization voltage threshold, i.e., the voltage required to permanently polarize drive plate 14, so that the readout process is nondestructive and the device can be interrogated indefinitely without need for an automatic rewrite cycle, as is normally required in destructive readout memory devices. Lead 20 is connected to ground G by switch 42 and an interrogating readout voltage pulse $V_{in}$ is applied to lead 26 through switch 44. This voltage pulse may be on the order of 20 volts positive direct current. Application of the readout voltage pulse causes the drive plate 14 to contract or expand in a direction dependent on its prepolarization, as well as on the polarity of the applied readout voltage pulse. The direction of the contraction or expansion will be both laterally and perpendicularly of the plane defined by plate 14. Since the drive plate 14 is bonded by epoxy 18 to the memory plate 12, any change in physical dimensions of the former, will cause corresponding changes in physical dimensions of the latter. When the memory plate is thus stressed, it develops a voltage which appears across leads 20 and 22, with the polarity on lead 22 being positive or negative, dependent on the state of prepolarization of the memory plate as well as the direction of mechanical stress. With reference to FIGURE 5A, application of a positive voltage pulse $V_{in}$ to conductive lead 26 results in a positive output voltage appearing on lead 22 with respect to lead 20. This output voltage may be applied to a suitable output circuit OUT through switch 48. Thus, by interrogating memory device 10, which stores a binary "1" signal, with a positive voltage pulse $V_{in}$, an output voltage $V_{out}$ of positive polarity, i.e., a "1" signal, is developed. This function is illustrated by the wave forms shown in FIGURE 6, wherein the wave form of the output voltage $V_{out}$ is of the same polarity as that of the applied readout voltage $V_{in}$.

Figure 5B:
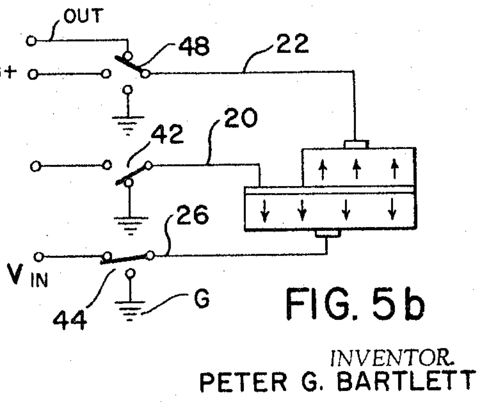

Similarly, if the memory device 10 stores a binary "0" signal, as illustrated in FIGURE 5B, then by applying the same readout voltage pulse $V_{in}$ to lead 26, the output voltage developed at lead 20 will be a negative voltage, i.e., $-V_{out}$. This function is illustrated by the wave forms illustrated in FIGURE 7, from which it will be noted that the wave form of the output voltage is of negative polarity, i.e., $-V_{out}$, in response to application of the positive readout voltage pulse $V_{in}$.

Since, in accordance with the present invention, memory plate 12 is secured to drive plate 14, as by epoxy 18, the memory plate 12 will be stressed in both lateral and vertical directions by the drive plate 14. The epoxy bond serves to restrain the lateral stresses and, hence, the memory plate will be stressed by forces acting laterally thereof for a period of time determined by the duration of the applied readout voltage pulse $V_{in}$. Thus, the duration of the output signal $V_{out}$, whether it be positive, i.e., a "1" signal, or negative, i.e., a "0" signal, is maintained for substantially the same duration as the applied readout voltage pulse $V_{in}$. This function is illustrated by the wave forms of FIGURES 6 and 7, from which it will be noted that the duration of the output signals $+V_{out}$ and $-V_{out}$ is substantially the same as that of the applied readout voltage pulse $V_{in}$.

Figure 9:
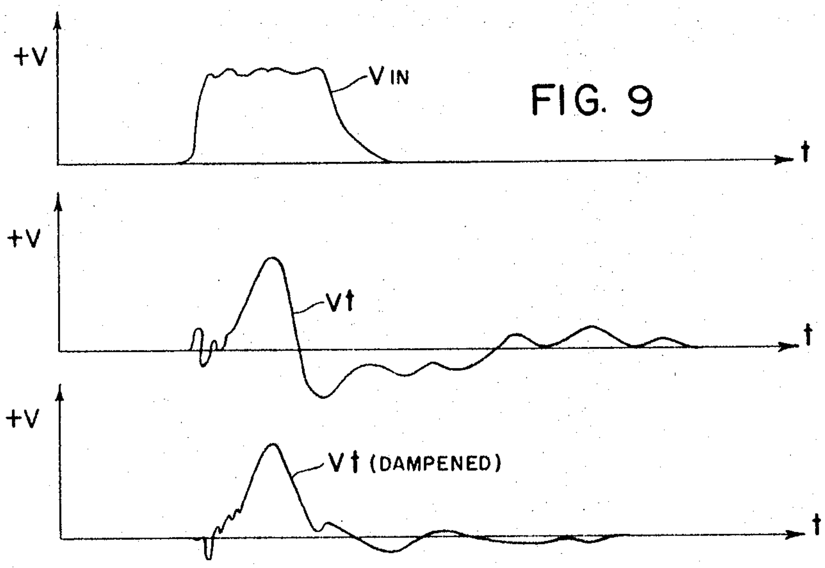
FIGURE 9 illustrates wave forms of voltage versus time for applied readout voltage and undampened and dampened transient response output voltages.

Tests have been conducted on a memory device, constructed in accordance with the embodiment of the invention illustrated in FIGURE 1, with and without the coating 30 of acoustic dispersive material. The results of the tests are illustrated by the wave forms of voltage versus time in FIGURES 8 and 9. These wave forms illustrate the steady state and transient voltage response to an applied readout voltage $V_{in}$. The steady state response, as previously discussed, has a time duration corresponding with that of the applied readout voltage $V_{in}$. When the memory device is not coated with acoustic dispersive material 30, the steady state output voltage is represented by the wave form $V_s$ illustrated in FIGURE 8, from which it will be noted that the wave form includes a considerable amount of voltage oscillation or "ringing." This is a result of vibrations of the memory device when it is pulsed with the readout voltage $V_{in}$. However, by applying an acoustic dispersive coating 30 to the memory device, the ringing is considerably dampened, as is illustrated by the voltage wave form $V_s$ (dampened) in FIGURE 8. From the standpoint of providing a practical operative memory device, it will be appreciated that a dampened, steady state response, i.e., voltage wave form $V_s$ (dampened), will be a more usable output signal for gating associated circuitry than that of the undampened steady state response $V_s$.

Similarly, tests were also conducted to determine the transient response to an applied readout voltage $V_{in}$ with and without the coating of acoustic dispersive material 30. The results of this test are shown by the wave forms illustrated in FIGURE 9. The transient response is the voltage output in response to mechanical stresses acting on the memory plate 12 in a direction vertically of its plane. The vertical stresses are not restrained to the extent of those in a lateral direction and, hence, the output signal takes the form of an undampened alternating voltage signal which commences with a sharp impulse and then quickly decays. The undampened response is illustrated by the wave form $V_t$ in FIGURE 9, and the dampened response, i.e., with coating 30 applied to the memory device, is illustrated by the wave form $V_t$ (dampened). From the wave forms it will be appreciated that by applying the coating 30 to the memory device, the dampened transient response $V_t$ (dampened) takes on a more distinctive character and is more easily detected than that of an undampened transient response. In accordance with the present invention, both the steady state and transient responses are sensed and the wave form of the undampened response takes the form of a composite of wave forms $V_s$ and $V_t$, and the wave form of the dampened response takes the form of a composite of the wave forms $V_s$ (dampened) and $V_t$ (dampened).

Figure 10:
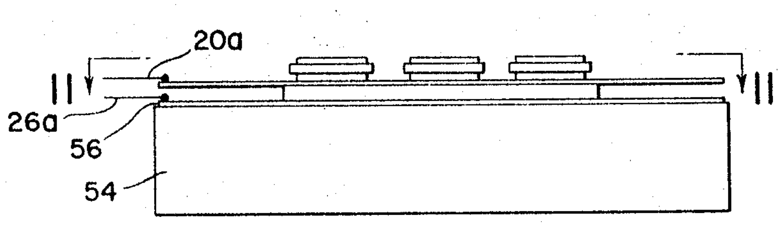
FIGURE 10 is an elevational view of another embodiment of the invention using the embodiments illustrated in FIGURE 1.
Figure 11:
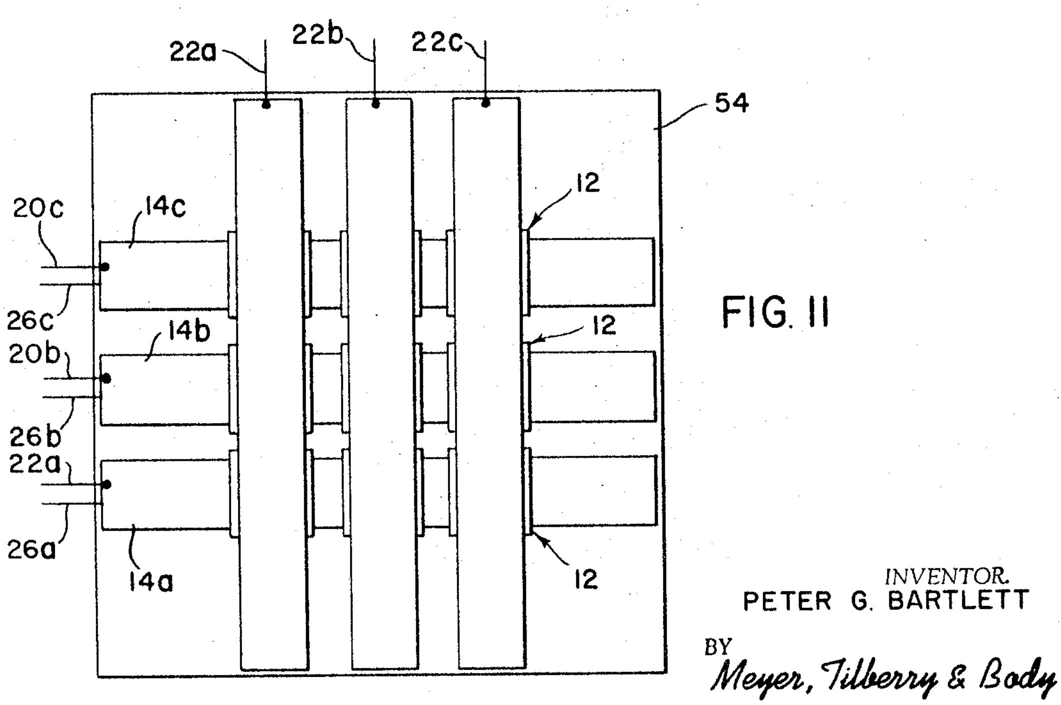
FIGURE 11 is a plan view taken along lines 11—11 looking in the direction of the arrows in FIGURE 10.

Referring now to FIGURES 10 and 11, there is illustrated another embodiment of the invention based on that illustrated in FIGURE 1 and, accordingly, like character references are used to identify like components. This embodiment takes the form of a matrix of memory devices wherein nine memory plates 12 are secured in rows of three each to three common drive plates 14*a*, 14*b* and 14*c* in the manner previously described with reference to the securing of memory plate 12 to drive plate 14 in FIGURE 1. The three common drive plates 14*a*, 14*b* and 14*c* are secured to a relatively thick substrate plate 54 by means of a conductive bond 56, which preferably takes the form of epoxy silver solder. Plate 54 may be constructed of any suitable acoustic dispersive material and, for example, may be constructed of ferroelectric material, such as lead zirconium titanium oxide, if desired. The purpose of the acoustic dispersive material is to absorb and dampen vibrations of the memory array when readout signal voltage pulses are applied. Alternatively, or in addition, the matrix may itself be coated with acoustic dispersive material, such as the epoxy coating 30 used with the embodiment illustrated in FIGURE 1. Electrical leads 22*a*, 22*b* and 22*c* are secured to the memory plates 12, as shown in FIGURE 11, in the same manner that electrical lead 22 is secured to memory plate 12 in the embodiment illustrated in FIGURE 1. Leads 22*a*, 22*b* and 22*c* serve as output conductors during interrogation of the matrix. Similarly, common electrical leads 20*a*, 20*b* and 20*c* are secured to common drive plates 14*a*, 14*b* and 14*c*, respectively, in the same manner as electrical lead 20 is secured to drive plate 14 in the embodiment illustrated in FIGURE 1. Also, drive electrical leads 26*a*, 26*b* and 26*c* are secured to the lower surfaces of drive plates 14*a*, 14*b* and 14*c* in the same manner as electrical lead 26 is secured to the lower surface of drive plate 14 in the embodiment illustrated in FIGURE 1.

Figure 12:
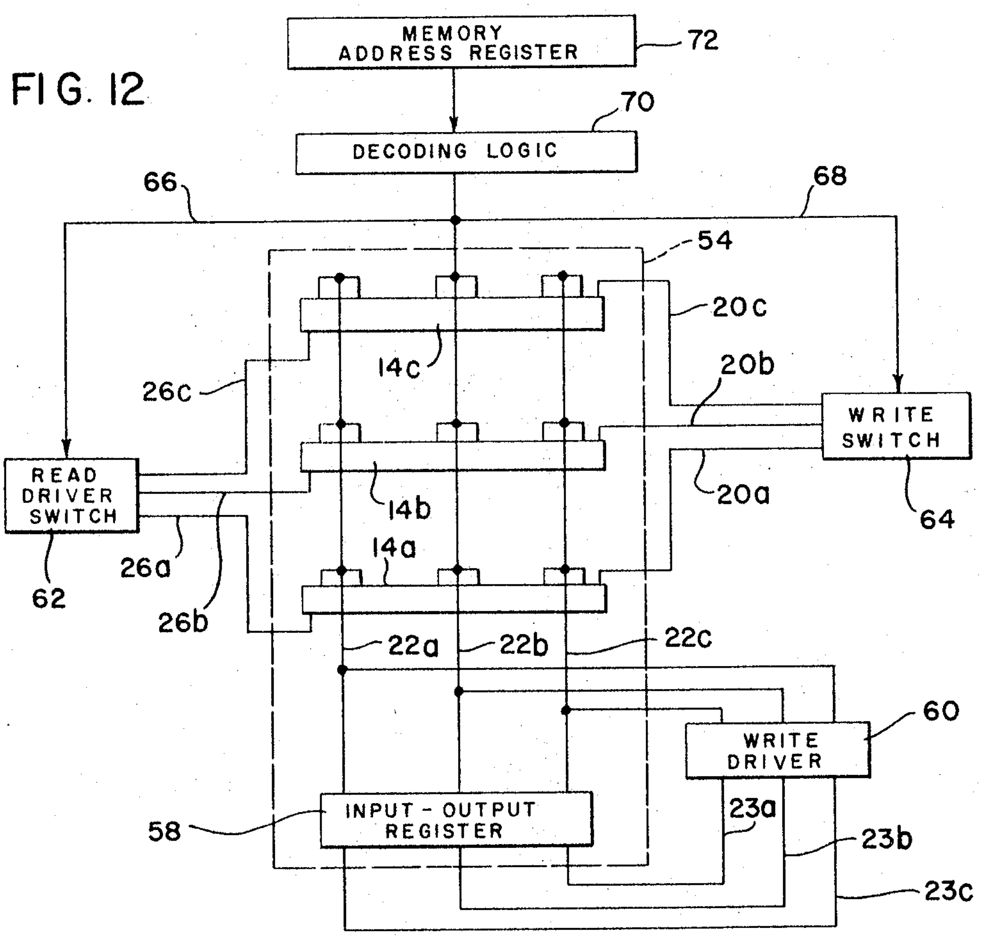
FIGURE 12 is a schematic illustration of another embodiment of the invention together with associated circuitry.

Reference is now made to FIGURE 12 wherein the embodiment of the invention, as illustrated in FIGURES 10 and 11, is schematically illustrated, together with associated circuitry for entering binary information to be stored in the memory matrix and for interrogating same. As illustrated in FIGURE 12, electrical leads 22*a*, 22*b* and 22*c* are connected to both an input-output register 58 and a write driver 60, which are connected with each other by means of electrical leads 23*a*, 23*b* and 23*c*. Electrical leads 26*a*, 26*b* and 26*c* are connected to a read driver and switching device 62, and leads 20*a*, 20*b* and 20*c* are connected to a write switching device 64. The read driver and switching device 62 and the write switching device 64 are electrically connected by electrical leads 66 and 68, respectively, to a decoding logic device 70, which is in turn electrically connected with a memory register device 72.

Before applying binary word information to the memory matrix, information should be known as to the address of the word and the contents of the word. The address information is applied to the memory address register 72 and the information is then decoded by the decoding logic device 70. The decoding logic device 70 in turn develops a decoder output signal which energizes the proper write switch within the write switch device 64. The write switch device in turn returns the common input, i.e., leads 20*a*, 20*b* and 20*c*, of the selected word cell to ground potential. In this mode of operation all of the drive plate circuits, i.e., leads 26*a*, 26*b* and 26*c*, are open circuited in the read drive device 62. The contents of the word is applied to the input-output register 58, and this binary information is fed to the write driver 60. The write driver 60 in turn applies a voltage signal to all of the bit lines, i.e., leads 22*a*, 22*b* and 22*c*. The polarity of these voltage input signals is controlled by the input register 58, i.e., the binary "1" signals are written with a positive polarity and, conversely, the binary "0" signals are written with a negative polarity. In this manner, the proper polarization voltage is applied across the memory cells common to the bit line and, hence, the selected word.

In the read operation of the matrix, the address of the binary coded word to be readout is decoded by the decoding logic device 70. A logic output signal is developed and serves to select the proper word line by energizing the proper read switch in the read switch driver and switch device 62. This device in turn applies a read voltage signal pulse to the selected drive plate 14*a*, 14*b* or 14*c* through leads 26*a*, 26*b* or 26*c*, respectively. Induced output voltages from the corresponding memory plates are then applied to the input-output register 58 through the bit lines, i.e., leads 22*a*, 22*b* and 22*c*. In this mode of operation, the common leads 20*a*, 20*b* and 20*c* are connected together and returned to ground potential through the write switch 64.

Figure 13:
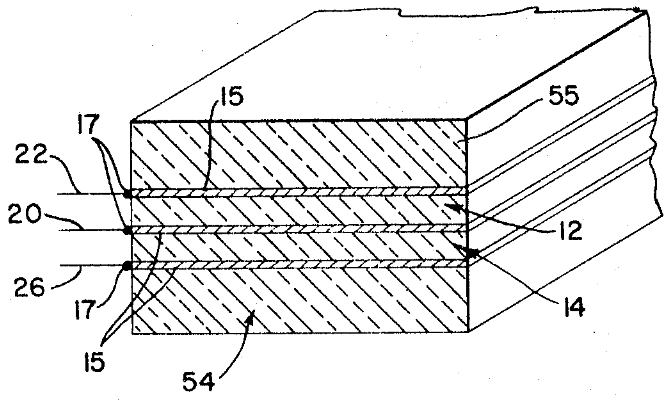
FIGURE 13 is a perspective view, partly in section illustrating the preferred embodiment of the invention.

Referring now to FIGURE 13, there is shown the preferred embodiment of the invention which is similar to that illustrated in FIGURE 1 and, accordingly, like reference characters are used to identify like components. It will be noted that the embodiment illustrated in FIGURE 13 does not include epoxy 18 for bonding memory plate 12 to drive drive plate 14. Instead, the facing surfaces of plates 12 and 14 of FIGURE 13 are adhesively bonded to each other by heat fusing. More particularly, the memory device is constructed by first laying down a relatively thick dampening block 54 of acoustic dispersive ceramic material in a green state, i.e., not heat fused but ceramic powder mixed with a binder. Preferably, the green ceramic takes the form of powdered lead zirconium titanium oxide and any suitable binder that will oxidize and burn off when heated, such as paraffin. A layer of powdered conductive material 15, such as powdered platinum oxide, is then applied to the upper surface of block 54. Another layer of green ceramic material, preferably lead zirconium titanium oxide, is applied on top of conductive material 15 to define drive plate 14. Then, another layer of powdered conductive material 15 is applied to the upper surface of plate 14. On top of this layer of conductive material 15, another layer of green ceramic material, preferably lead zirconium titanium oxide, is applied to define memory plate 12. Another layer of powdered conductive material 15 is applied to the upper surface of plate 12. Lastly, another relatively thick layer of green ceramic material is applied to define upper dampening block 55. This composite structure is then heated to a temperature, approximately 2400° F. to 2500° F., sufficient that the material fuses, whereby each layer of material is securely bonded to its adjacent layer of material. The resultant bond is sufficient that the driving plate 14 transmits mechanical forces to the memory plate 12 so that the forces act in directions both laterally and perpendicularly of plate 12. Lastly, output lead 22, common lead 20 and interrogating lead 26 are respectively secured to the three conductive layers 15, as by soldering with silver solder 17. Dampening blocks 54 and 55 are on the order of fifteen times as thick as plates 12 or 14, and serve as acoustic dispersive means.

The description of the embodiments of the invention has defined memory plate 12 and drive plate 14 as being substantially flat defining planes disposed in superimposed relationship. It is to be appreciated, however, that the plates need not be flat and need not define parallel planes. The plates may be of a different geometric configuration, such as inner and outer spheres or inner and outer cylindrical sleeves, with one plate overlying and securely bonded, as by epoxy or heat fusing, to the other plate so that forces are transmitted from the driver plate to the memory plate, acting in directions both perpendicularly and laterally of the particular geometric configuration. Also, the facing surfaces of memory plate 12 and drive plate 14 need not be flat, although they are preferably approximately flat, so long as the two surfaces are secured to each other, as by bonding with cement, epoxy or heat fusing, et cetera.

Laboratory tests have been conducted on memory devices constructed in accordance with the present invention. These tests have confirmed that the memory device functioned satisfactorily over a temperature range from approximately −55° to 100° centigrade. The total degradation of the output voltage obtained over the entire temperature range was on the order of ±15%. In the test, the polarization voltage applied was on the order of 200 volts for a seven millimeter thickness drive plate 14. The applied readout voltage $V_{in}$ was on the order of 20 volts direct current and the output voltage obtained was on the order of 1 volt for a transient response and on the order of .6 volt for steady state response. The nature of the output was capacitive and the speed of operation appears to be limited only by physical delays of the ceramic material used as no automatic rewrite operation is required, as in the case of ferromagnetic cores.

Although the invention has been shown in connection with preferred embodiments, it will be readily apparent to those skilled in the art that various changes in form and arrangement of parts may be made to suit requirements without departing from the spirit and scope of the invention as defined by the appended claims.

Having thus described my invention, I claim:

1. A ceramic memory device comprising:
a ferroelectric storage capacitor memory plate having a surface, said plate adapted to be polarized in one of two stable states;
driving means having a surface, said memory plate surface and said driving means surface being aligned to face each other, at least a portion of the surface area of one said surface being adhesively secured to and over substantially all of a corresponding portion of the surface area of the other said surface to prevent at least relative lateral movement therebetween so that said driving means may transmit mechanical forces to said memory plate in directions both laterally and perpendicularly of said surfaces so as to mechanically stress said memory plate;
and means for obtaining output signals from said memory plate in response to forces imparted thereto by said driving means.

2. A ceramic memory device as set forth in claim 1 wherein said driving means is adhesively secured to said memory plate by means of an epoxy.

3. A ceramic memory device as set forth in claim 2 wherein said epoxy is of conductive material so that said memory plate and driving means are electrically connected together.

4. A ceramic memory device as set forth in claim 1 wherein said driving means exhibits the characteristic that it will change its physical dimensions in response to application of an electrical signal thereto.

5. A ceramic memory device as set forth in claim 4 wherein said driving means exhibits piezoelectric characteristics.

6. A ceramic memory device as set forth in claim 1 wherein said device is coated with a dampening medium.

7. A ceramic memory device as set forth in claim 1 wherein said device is bonded to an acoustic dispersive medium.

8. A ceramic memory device as set forth in claim 1 wherein said driving means is a plate of piezoelectric material and which in its unstressed condition is approximately flat.

9. A ceramic memory device as set forth in claim 8 wherein said driving plate is constructed of ferroelectric material, adapted to be polarized in one of two stable states.

10. A ceramic memory device as set forth in claim 9 wherein said memory plate-driving plate structure is coated with epoxy.

11. A ceramic memory device as set forth in claim 9 wherein said memory plate-driving plate is bonded to an acoustic dispersive medium.

12. A ceramic memory device as set forth in claim 9 wherein a plurality of said memory plates are secured to said driving plate so that said driving plate serves as a common driving plate for transmitting forces to said plurality of memory plates.

13. A ceramic memory device as set forth in claim 12 including a plurality of common driving plates each having a plurality of memory plates secured thereto, individual output circuit means each electrically connecting together one memory plate from each of said plurality of common driving plates.

14. A ceramic memory device as set forth in claim 13 wherein said plurality of common driving plates are each bonded to a block of acoustic dispersive material.

15. A ceramic memory device as set forth in claim 1, wherein said driving means is adhesively secured to said memory plate by a heat fusion bond.

16. A ceramic memory device as set forth in claim 4 including means for applying a said electrical signal to said driving means.

17. A ceramic memory device as set forth in claim 16, including means for selectively polarizing said memory plate in one of said two stable states.

18. A ceramic memory device as set forth in claim 9, including means for selectively polarizing said memory plate in one of two stable states, and means for applying an interrogating readout voltage to said driving plate of a magnitude substantially less than that required to polarize said driving plate and sufficient to cause said driving plate to transmit said mechanical forces to said memory plate.

19. A ceramic memory device comprising:
first and second ferroelectric storage capacitor plates each having opposing surfaces and exhibiting piezoelectric characteristics and adapted to be polarized in one of two stable states by application of a polarizing direct current potential in one of two opposing directions between the opposing surfaces of a said plate;

said first plate being polarized in one stable state by application thereto of a said polarizing potential;

circuit means coupled to the opposing surfaces of said second plate for selectively applying therebetween a polarizing potential in one of said two opposing directions to polarize said second plate in one of said stable states;

said first and second plates being aligned in substantially superimposed parallel relationship with one said surface of said first plate facing one said surface of said second plate, at least a portion of the surface area of one said facing surface being adhesively secured to and over all of a corresponding portion of the surface area of the other said facing surface to prevent at least relative lateral movement therebetween so that said first plate may transmit mechanical forces to said second plate in directions both laterally and perpendicularly of said facing surfaces so as to mechanically stress said second plate;

means for applying an interrogating voltage between the opposing surfaces of said first plate of a magnitude sufficient to cause said first plate to transmit mechanical forces to said second plate in directions acting both laterally and perpendicularly of said facing surfaces so as to mechanically stress said second plate, whereby an output voltage is developed across the opposing surfaces of said second plate of polarity dependent upon its state of polarization.

References Cited

UNITED STATES PATENTS

| | | | |
|---|---|---|---|
| 2,782,397 | 2/1957 | Young | 340—173.2 |
| 3,118,133 | 1/1964 | Meeker | 340—173.2 |

TERRELL W. FEARS, Primary Examiner

U.S. Cl. X.R.

310—9.1